US012169705B2

United States Patent
Taki et al.

(10) Patent No.: US 12,169,705 B2
(45) Date of Patent: Dec. 17, 2024

(54) INFORMATION PROCESSING APPARATUS, CONTROL SYSTEM, SYSTEM, INFORMATION PROCESSING METHOD, CONTROL METHOD AND COMPUTER-READABLE STORAGE MEDIUM

(71) Applicant: HONDA MOTOR CO., LTD., Tokyo (JP)

(72) Inventors: Tomoaki Taki, Tokyo (JP); Yosuke Shionoya, Tokyo (JP); Koichiro Nakamura, Tokyo (JP); Kohei Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 95 days.

(21) Appl. No.: 17/572,661

(22) Filed: Jan. 11, 2022

(65) Prior Publication Data

US 2022/0222062 A1    Jul. 14, 2022

(30) Foreign Application Priority Data

Jan. 14, 2021   (JP) ................. 2021-004567

(51) Int. Cl.
*G06F 8/65* (2018.01)
*G06F 8/71* (2018.01)
*G07C 5/00* (2006.01)

(52) U.S. Cl.
CPC .............. *G06F 8/65* (2013.01); *G06F 8/71* (2013.01); *G07C 5/008* (2013.01)

(58) Field of Classification Search
None
See application file for complete search history.

(56) References Cited

U.S. PATENT DOCUMENTS

2005/0033503 A1*  2/2005  Yamamoto ............ F02D 41/042
                                                   307/10.3
2011/0320089 A1* 12/2011  Lewis ................ G01C 21/3896
                                                   380/278
(Continued)

FOREIGN PATENT DOCUMENTS

CN      112099845 A   * 12/2020
CN      112134940 A   * 12/2020
(Continued)

OTHER PUBLICATIONS

Office Action issued for counterpart Japanese Application No. 2021-004567, issued by the Japanese Patent Office on Nov. 29, 2022 (drafted on Nov. 25, 2022).

*Primary Examiner* — Philip Wang
*Assistant Examiner* — Rongfa P Wang

(57) ABSTRACT

Provided is a control system, including: an acquisition unit, configured to acquire, from an mobile object, version information of each of a plurality of programs for controlling each of a plurality of mobile object control units included in the mobile object; a storage control unit, configured to store the acquired version information; a selection unit, configured to select an update program of at least one mobile object control unit among the plurality of mobile object control units; and an output control unit, configured to output the selected update program to the mobile object, wherein the selection unit is configured to select update program of at least one mobile object control unit among a plurality of mobile object control units included in the mobile object, based on the newly acquired version information, when the newly acquired version information newly acquired is not consistent with the stored version information.

18 Claims, 10 Drawing Sheets

(56) References Cited

U.S. PATENT DOCUMENTS

| | | | |
|---|---|---|---|
| 2018/0074811 A1* | 3/2018 | Kiyama | H04L 67/12 |
| 2019/0278588 A1* | 9/2019 | Miyake | G06F 8/71 |
| 2020/0249930 A1* | 8/2020 | Abe | G06F 9/4401 |
| 2021/0026617 A1* | 1/2021 | Maru | G06F 8/65 |
| 2021/0103438 A1* | 4/2021 | Itatsu | G06F 13/00 |
| 2021/0155176 A1 | 5/2021 | Harata | |
| 2021/0191661 A1* | 6/2021 | Harata | G06F 8/61 |

FOREIGN PATENT DOCUMENTS

| | | | | |
|---|---|---|---|---|
| CN | 112666927 | A | * | 4/2021 |
| JP | H06239259 | A | * | 8/1994 |
| JP | 2018036975 | A | | 3/2018 |
| JP | 2019159401 | A | | 9/2019 |
| JP | 2020027626 | A | | 2/2020 |
| JP | 2020027666 | A | | 2/2020 |
| JP | 2020027670 | A | | 2/2020 |
| JP | 2020123253 | A | | 8/2020 |
| KR | 20200067742 | A | * | 6/2020 |
| KR | 20220028879 | A | * | 3/2022 |

* cited by examiner

| ID | VERSION | PROGRAM DATA |
|---|---|---|
| ECU01 | A2.1 | PROGRAM01_A21 |
| ECU02 | A1.8 | PROGRAM02_A18 |
| ECU02 | A2.0 | PROGRAM02_A21 |
| ... | ... | ... |

*FIG.4*

| ECU01 | ECU02 | ECU03 |
|---|---|---|
| A2.0 | A2.0 | A2.2 |

*FIG.5*

| VID | ECU01 | ECU02 | ECU03 |
|---|---|---|---|
| V001 | A2.1 | A2.0 | A2.2 |
| V002 | A1.7 | A1.8 | A1.9 |
| ⋮ | ⋮ | ⋮ | ⋮ |

*FIG.6*

| ECU01 | ECU02 | ECU03 |
|-------|-------|-------|
| A2.0  | A1.8  | A2.2  |

FIG.8

|  | CASE 1: MATCHES THE VERSION TO BE UPDATED | CASE 2: OLDER VERSION THAN CURRENT | CASE 3: FOR DIFFERENT SYSTEMS | CASE 4: SAME VERSION AS CURRENT |
|---|---|---|---|---|
| TIMING 1: BEFORE RECEIVING UPDATE INFORMATION | CONFIGURATION SYNCHRONIZATION IMPLEMENTATION | CONFIGURATION SYNCHRONIZATION IMPLEMENTATION | CONFIGURATION SYNCHRONIZATION IMPLEMENTATION | CONFIGURATION SYNCHRONIZATION IMPLEMENTATION |
| TIMING 2: WRITING | DESTROY UPDATE INFORMATION CONFIGURATION SYNCHRONIZATION IMPLEMENTATION | DESTROY UPDATE INFORMATION CONFIGURATION SYNCHRONIZATION IMPLEMENTATION | DESTROY UPDATE INFORMATION CONFIGURATION SYNCHRONIZATION IMPLEMENTATION | CONTINUE WRITING |
| TIMING 3: AFTER WRITING IS COMPLETE | DESTROY UPDATE INFORMATION CONFIGURATION SYNCHRONIZATION IMPLEMENTATION | DESTROY UPDATE INFORMATION CONFIGURATION SYNCHRONIZATION IMPLEMENTATION | DESTROY UPDATE INFORMATION CONFIGURATION SYNCHRONIZATION IMPLEMENTATION | FAILURE NOTIFICATION |
| TIMING 4: AFTER ACTIVATION IS COMPLETE | SUCCESS NOTIFICATION | FAILURE NOTIFICATION | FAILURE NOTIFICATION | FAILURE NOTIFICATION |

*FIG.9*

INFORMATION PROCESSING APPARATUS, CONTROL SYSTEM, SYSTEM, INFORMATION PROCESSING METHOD, CONTROL METHOD AND COMPUTER-READABLE STORAGE MEDIUM

The contents of the following Japanese patent application(s) are incorporated herein by reference:

NO. 2021-004567 filed in JP on Jan. 14, 2021.

BACKGROUND

1. Technical Field

The present invention relates to an information processing apparatus, a control system, a system, an information processing method, a control method and a computer-readable storage medium.

2. Related Art

Patent Document 1 discloses an ECU for vehicle in which the application program can be rewritten.

PRIOR ART DOCUMENT

Patent Document

Patent Document 1: Japanese Patent Application Publication No. 2020-27666

BRIEF DESCRIPTION OF THE DRAWINGS

FIG. 4 illustrates program registration information stored by the information processing apparatus 70 in a tabulated form.

FIG. 5 illustrates management information stored by each ECU of a vehicle 20 in a tabulated form.

FIG. 6 illustrates configuration information stored by the information processing apparatus 70 in a tabulated form.

FIG. 8 illustrates management information stored by each ECU of the vehicle 20 after maintenance.

FIG. 9 illustrates the mapping between the combination of timing and version when the vehicle 20 is turned to be IG on and the process performed by the control system 200.

DESCRIPTION OF EXEMPLARY EMBODIMENTS

Hereinafter, the present invention will be described through embodiments of the invention, but the following embodiments do not limit the invention according to the claims. In addition, not all of the combinations of features described in the embodiments are essential to the solving means of the invention.

Figure 1:
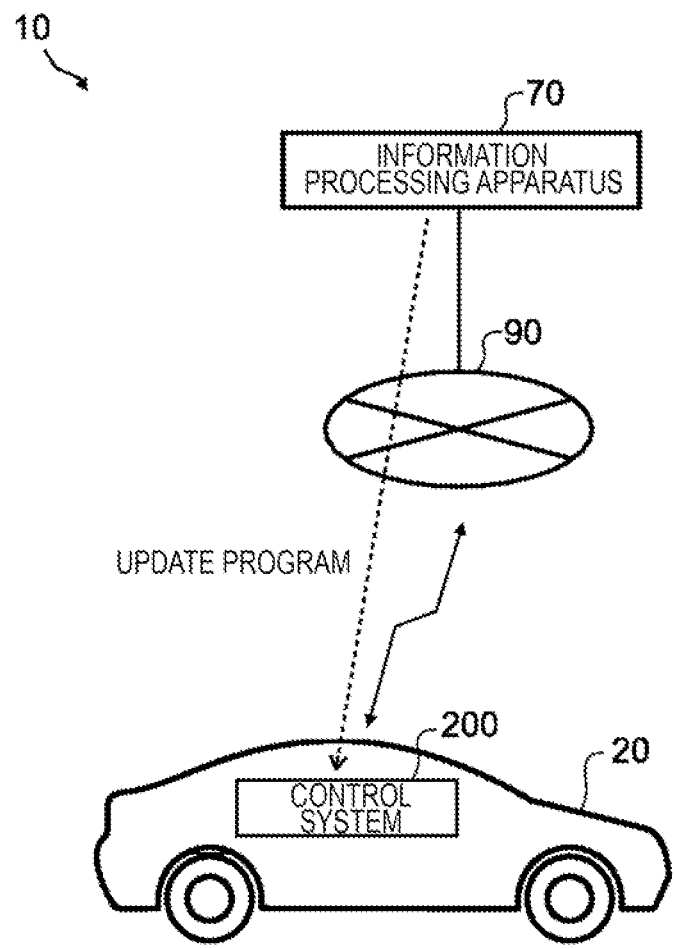
FIG. 1 schematically illustrates an update system 10 according to one embodiment.

FIG. 1 schematically illustrates an update system 10 according to one embodiment. The update system 10 includes a vehicle 20 and an information processing apparatus 70. The vehicle 20 includes a control system 200. The control system 200 is responsible for the control of the vehicle 20, and the communication with the information processing apparatus 70 through a communication network 90. The communication network 90 includes an IP network such as the Internet, a P2P network, a dedicated line including VPN, a virtual network, a mobile communication network and so on.

In the vehicle 20, the control system 200 includes a plurality of ECUs (Electronic Control Units) that controls the vehicle 20. The control system 200 acquires the update program of the ECU included in the control system 200 from the outside. For example, the control system 200 receives, by wireless communication, the update program transmitted from the information processing apparatus 70 through the communication network 90. The control system 200 reprograms the ECU included in the control system 200 with the update program. The reprogramming is performed with the objectives such as upgrading the function of the ECU included in the control system 200. In this way, the control system 200 updates the ECU by reprogramming the ECU by OTA (Over The Air). In the present embodiment, updating the devices such as the ECU with an update program is referred to as "program update".

Each ECU in the control system 200 stores version information of the program that controls each ECU. When the IG (ignition) power source of the vehicle 20 is turned on, the control system 200 acquires version information of the program stored by each ECU, and transmits the management information including the version information to the information processing apparatus 70. The information processing apparatus 70, based on the version information included in the management information acquired from the control system 200, transmits the program of the new version as an update program to the vehicle 20, when a program of a version, which is newer than the version of the program of each ECU included in the control system 200 can be provided.

The information processing apparatus 70 stores the newest management information received from the control system 200 of the vehicle 20. When the information processing apparatus 70 has newly received management information from the control system 200, the information processing apparatus 70 compares the version information of each ECU stored by the information processing apparatus 70 with the version information of each ECU included in the management information newly received from the control system 200 to determine whether there are any ECUs whose version information does not match. If there is an ECU whose version information does not match, the information processing apparatus 70 transmits a program that matches the version information stored by the information processing apparatus 70 to the control system 200 as an update program for the ECU. This makes it possible to match the version of the program of each ECU included in the control system 200 with the legitimate version managed by the information processing apparatus 70.

For example, after performing the program update of the ECU included in the control system 200 by OTA, when the vehicle 20 is maintained, the ECU may be replaced with one that has an older version of the program installed. Each ECU included in the control system 200 desirably has a compatible version of the program installed that has been tested for operation. If an ECU with an older version of the program installed, when the vehicle 20 is maintained, is introduced, it may not be able to fully utilize the functions added by past OTAs.

As described above, when the information processing apparatus 70 determines that there is an ECU whose version information does not match based on the management information received when the vehicle 20 starts up, the information processing apparatus 70 transmits a program that matches the version information stored by the information processing apparatus 70 to the control system 200 as an update program for the ECU. This makes it possible to match the version managed by the information processing apparatus 70. This ensures that the function added by past OTAs can be fully utilized.

Figure 2:
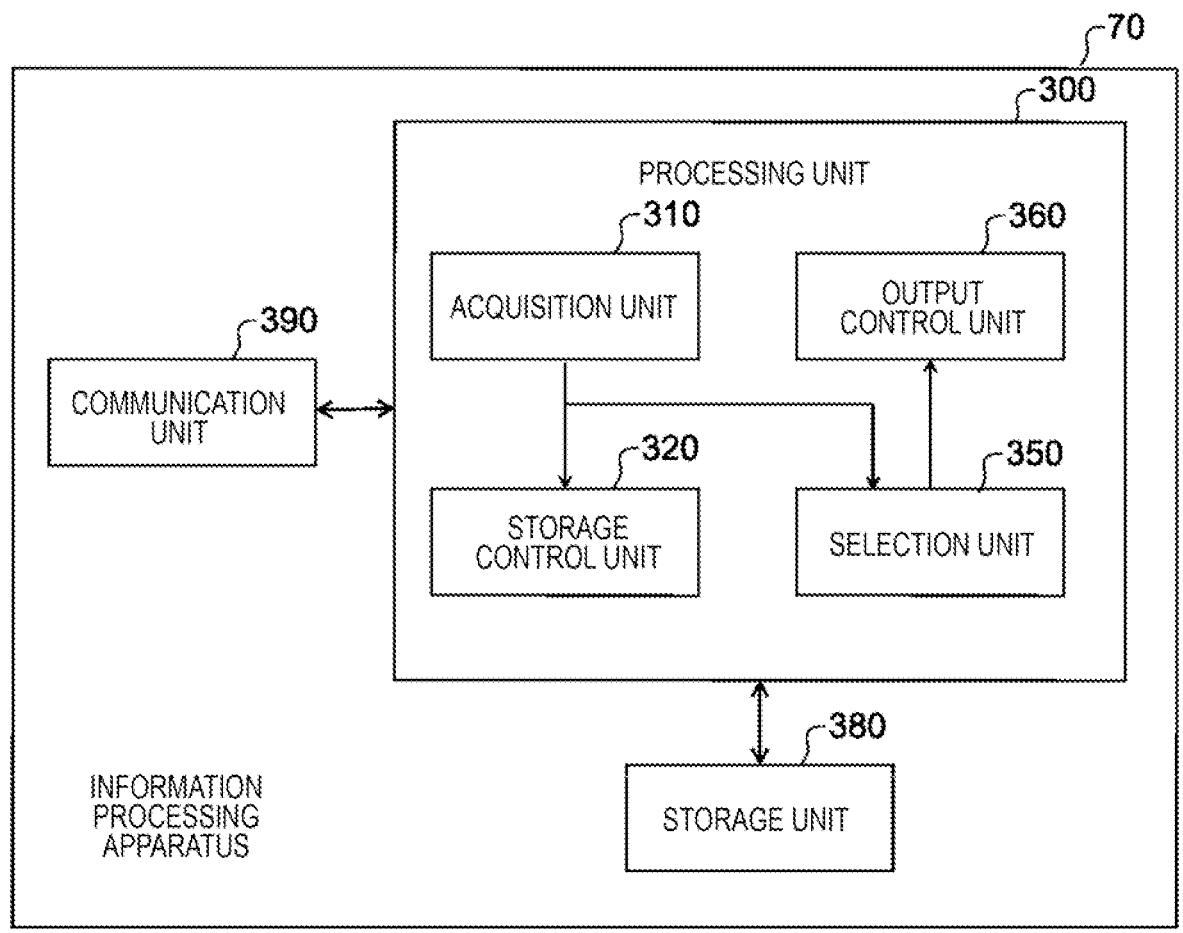
FIG. 2 schematically illustrates a system configuration included in an information processing apparatus 70.

FIG. 2 schematically illustrates a system configuration included in the information processing apparatus 70. The information processing apparatus 70 includes a processing apparatus 300, a storage unit 380 and a communication unit 390. The processing apparatus 300 includes an acquisition unit 310, a storage control unit 320, an output control unit 360 and a selection unit 350.

The processing apparatus 300 is realized by a calculation processing apparatus including a processor, for example. The storage unit 380 is realized by including a non-volatile storage medium. The processing apparatus 300 performs the processing using the information stored in the storage unit 380. The communication unit 390 is responsible for the communication with the control system 200.

The acquisition unit 310 acquires the respective version information of a plurality of programs that control each of the plurality of ECUs included in the vehicle 20, from the vehicle 20. For example, the acquisition unit 310 acquires the version information transmitted when the vehicle 20 starts up. The storage control unit 320 causes the version information acquired by the acquisition unit 310 to be stored. For example, the storage control unit 320 causes the storage unit 380 to store the version information. The selection unit 350 selects the update program of at least one ECU of the plurality of ECUs. The output control unit 360 causes the update program selected by the selection unit 350 to the vehicle 20 to be output. For example, the output control unit 360 transmits the update program to the vehicle 20 through the communication unit 390. The selection unit 350 selects the update program of at least one ECU among the plurality of ECUs included in the vehicle 20 based on the version information newly acquired by the acquisition unit 310 when the version information newly acquired by the acquisition unit 310 is not consistent with the version information stored by the storage control unit 320.

The selection unit 350 selects an update program for at least one of the plurality of ECUs based on the version information newly acquired by the acquisition unit 310 so that the combination of versions of the plurality of programs is consistent with a predetermined combination of regular versions. The storage control unit 320 stores the version information newly acquired by the acquisition unit 310 after the output control unit 360 causes the update program selected by the selection unit 350 to be output to the vehicle 20, corresponding to the identification information of the vehicle 20.

Figure 3:
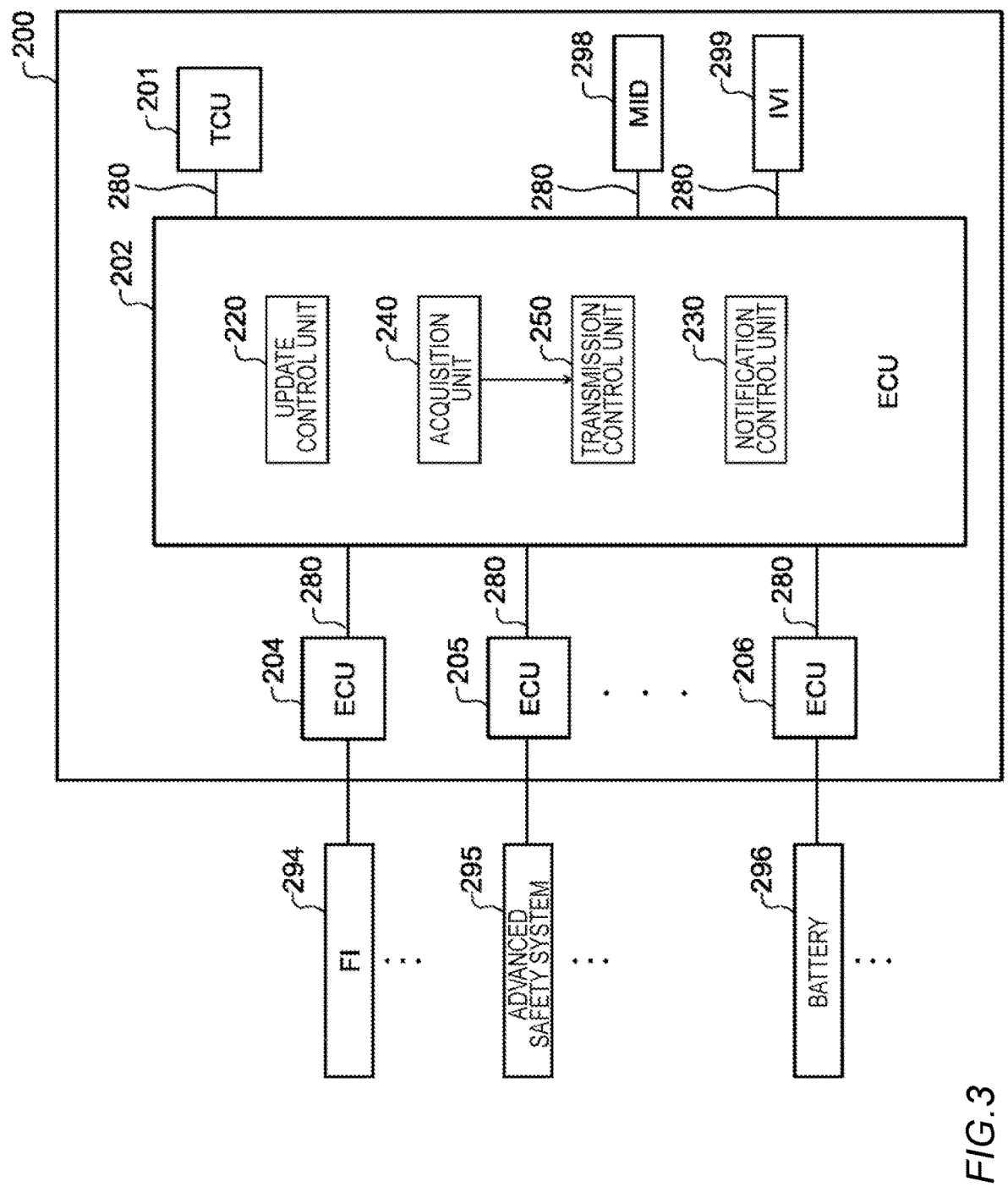
FIG. 3 schematically illustrates a system configuration included in a control system 200.

FIG. 3 schematically illustrates a system configuration included in the control system 200. The control system 200 includes a TCU 201, an ECU 202, an ECU 204, an ECU 205, an ECU 206, an MID 298 and an IVI 299. In FIG. 2, the FI 294, the advanced safety system 295 and the battery 296 are one example of the devices under control in the vehicle 20.

The ECU 202 is connected to the TCU 201, the ECU 204, the ECU 205 and the ECU 206 through an in-vehicle communication line 280. The ECU 202 communicates mutually with the TCU 201, the ECU 204, the ECU 205, the ECU 206, the MID 298 and the IVI 299 through the in-vehicle communication line 280. The ECU 202 integrally controls the TCU 201, the ECU 204, the ECU 205, the ECU 206, the MID 298 and the IVI 299. The in-vehicle communication line 280 may be configured to include, for example, the CAN (Controller Area Network) or the Ethernet (registered trademark) or the like.

The TCU 201 is a Telematics Control Unit (TCU). The TCU 201 is mainly responsible for the mobile communication. The TCU 201 performs transmission and reception of data with the information processing apparatus 70 based on the control of the ECU 202. The TCU 201 receives the update program transmitted from the information processing apparatus 70 by the mobile communication, based on the control of the ECU 202. The TCU 201 may function as a wireless communication unit.

The MID 298 is a multi-information display. The IVI 299 is, for example, an In-Vehicle Infotainment (IVI) information device. The MID 298 and the IVI 299 may function as a display control unit. The IVI 299 includes a wireless LAN communication function. The IVI 299 receives the update program transmitted from the information processing apparatus 70 by the wireless LAN communication, based on the control of the ECU 202.

The ECU 204, the ECU 205 and the ECU 206 are respectively an ECU that functions as a vehicle control unit for controlling the vehicle 20. The ECU 204, the ECU 205 and the ECU 206 are one example of a "mobile object control unit". The ECU 204, the ECU 205 and the ECU 206 control various devices included in the vehicle 20. For example, the ECU 204 controls the FI 294 that is a fuel injection apparatus. The ECU 205 controls the advanced safety system 295 and so on. The advanced safety system 295 is, for example, a battery that accumulates power supplied to the motor for travelling included in the vehicle 20. The ECU 206 controls a battery 296 and so on. The battery 296 functions as, for example, a power source of 12 V for vehicle. The battery 296 is, for example, a lead-acid battery and so on.

The present embodiment exemplifies a system configuration in which the control system 200 includes the TCU 201, the ECU 202, the ECU 204, the ECU 205, the ECU 206, the MID 298 and the IVI 299, but the system configuration of the control system 200 is not limited to the example of the present embodiment. In the present embodiment, as an example, it is explained that the mobile control units that may be subject to the program update are ECU 204 and ECU 205, and that ECU 202 functions as the update control unit that controls the program update. It should be noted that mobile control units that may be subject to the program update are not limited to these ECUs. The mobile control units that may be subject to the program update may be any of the TCU 201, the ECU 202, the ECU 204, the ECU 205, the ECU 206, the MID 298 and the IVI 299.

The ECU 202 includes an update control unit 220, a notification control unit 230, an acquisition unit 240, and a transmission control unit 250.

The update control unit 220 performs control on the program update of the vehicle 20. The transmission control unit 250 transmits the respective version information of the plurality of programs that control the plurality of ECUs respectively when the vehicle 20 starts up. For example, the transmission control unit 250 transmits the version information to the information processing apparatus 70 through the TCU 201 or the IVI 299.

After the transmission control unit transmits the version information, the update control unit 220 acquires the update program of at least one of the plurality of ECUs from the server that manages the combination of versions of the plurality of programs, and causes the update of the at least one ECU to be performed by the acquired update program. When the update of at least one ECU by the update program is completed, the transmission control unit 250 transmits the version information of each of the plurality of programs after the update to the server.

Herein, the program update is described. The program update processing when the target device for program update is an ECU and the memory for storing the ECU firmware is a single bank memory (so-called single-sided ROM) is described. In this case, since there is only one program storage area for storing the firmware of the ECU, the update program cannot be written to the program storage area when the ECU is operating according to the program stored in the program storage area. When performing the program update of the ECU, the update control unit 220 transfers the update program to the ECU, stores the update program in the predetermined data storage area of the ECU, and then instructs the ECU to update the program. When the ECU is instructed to update the program, it executes the control code to update program, writes the update program transferred to the data storage area into the program storage area, and activates the update program. Activating the update program includes the process of setting the startup parameters of the ECU, for example, to load the update program and start control based on the update program when the ECU starts up.

Next, the program update processing when the internal memory of the ECU is a double-bank memory (so-called 2-side ROM) is described. In this case, since the ECU has two program storage areas for storing firmware, an update program can be written to the second program storage area when the ECU is operating according to the program stored in the first program storage area. That is, the update program can be written to the second program storage area, which is the back surface, by the so-called back surface writing. Accordingly, for example, the update program can be written to the second program storage area even when the vehicle 20 is travelling. Therefore, when the update control unit 220 transfers the update program to the ECU, it instructs the ECU to write the update program to the second program storage area. When the writing of the update program to the second program storage area of the ECU is completed, the ECU is ready to perform program update. When the update control unit 220 performs the program update of the ECU, the update control unit 220 instructs the ECU to activate the update program written in the second program storage area. Activation of the update program includes, for example, the process of setting the startup parameters of the ECU so that the update program stored in the second program storage area is loaded and control based on the update program is started when the ECU starts up. For example, activating the update program includes the process of enabling the second program storage area as a program read area and disabling the first program storage area as a program read area. In this way, "program update" is a concept that includes instructing to write the update program to the program storage area of the ECU. Also, "program update" is a concept that includes instructing to activate an update program written to the program storage area.

In the program update of an ECU with an internal memory of a single bank memory, the possibility arises that the ECU will not be able to control the vehicle during the period when the update program is being written to the program storage area and during the period when the update program is being activated. On the other hand, in performing the program update of an ECU with an internal memory of a double-bank memory, the ECU can control the vehicle during the period when the update program is being written to the program storage area on the back surface. In the present embodiment, a case in which an ECU with an internal memory of a double-bank memory is updated is described. For example, it may be assumed that an ECU 205 with an internal memory of a double-bank memory is replaced during vehicle maintenance.

FIG. 4 illustrates program registration information stored by the information processing apparatus 70 in a tabulated form. The program registration information is stored in the storage unit 380 of the information processing apparatus 70.

The program registration information includes "ID", "version" and "program data". "ID" is identification information of the ECU. "Version" is a version name of the program that controls the ECU. "Program data" is information to identify image data of the program that controls the ECU. In the information processing apparatus 70, when the image data of a new version of the program is registered, the storage control unit 320 stores the image data of the registered program and the identification information of the ECU on which the program is to operate corresponding to the version name in the storage unit 380.

Figure 5:
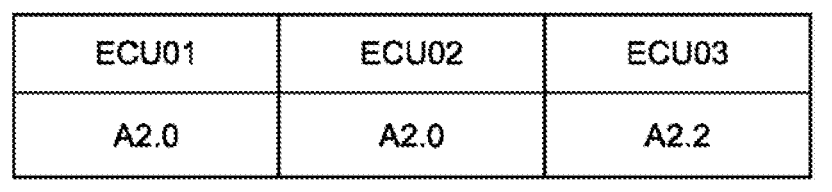

FIG. 5 illustrates management information stored by each ECU of the vehicle 20 in a tabulated form. The management information includes the version name of each of the plurality of programs that controls each of the plurality of ECUs. Version name is information required for performing program update of the ECU. In the present embodiment, "ECU 01" indicates the ECU 204, "ECU 02" indicates the ECU 205, "ECU 03" indicates the ECU 206. In the example shown in FIG. 5, it is indicated that the version name of the ECU 204 is "A2.0", the version name of the ECU 205 is "A1.8", and the version name of the ECU 206 is "A2.2". The management information stored by each ECU is collected by the update control unit 220 and stored by ECU 202 when the vehicle 20 starts up. Also, the management information stored by each ECU is transmitted to the information processing apparatus 70 by the control of the transmission control unit 250.

FIG. 6 illustrates configuration information stored by the information processing apparatus 70 in a tabulated form. The configuration information includes a plurality of pieces of management information received from a plurality of vehicles 20. The configuration information is stored in the storage unit 380. The configuration information includes VID that is the identification information of the vehicle, and the version name of each ECU included in the management information, which are received from each vehicle.

In the information processing apparatus 70, the selection unit 350 identifies the current version of the program that controls each ECU included in the vehicle 20 with reference to the configuration information. The selection unit 350 refers to the program registration information and selects a newer version of the program as the update program when it is registered. The output control unit 360 transmits the update program selected by the selection unit 350 to the vehicle 20 through the communication unit 390.

Figure 7:
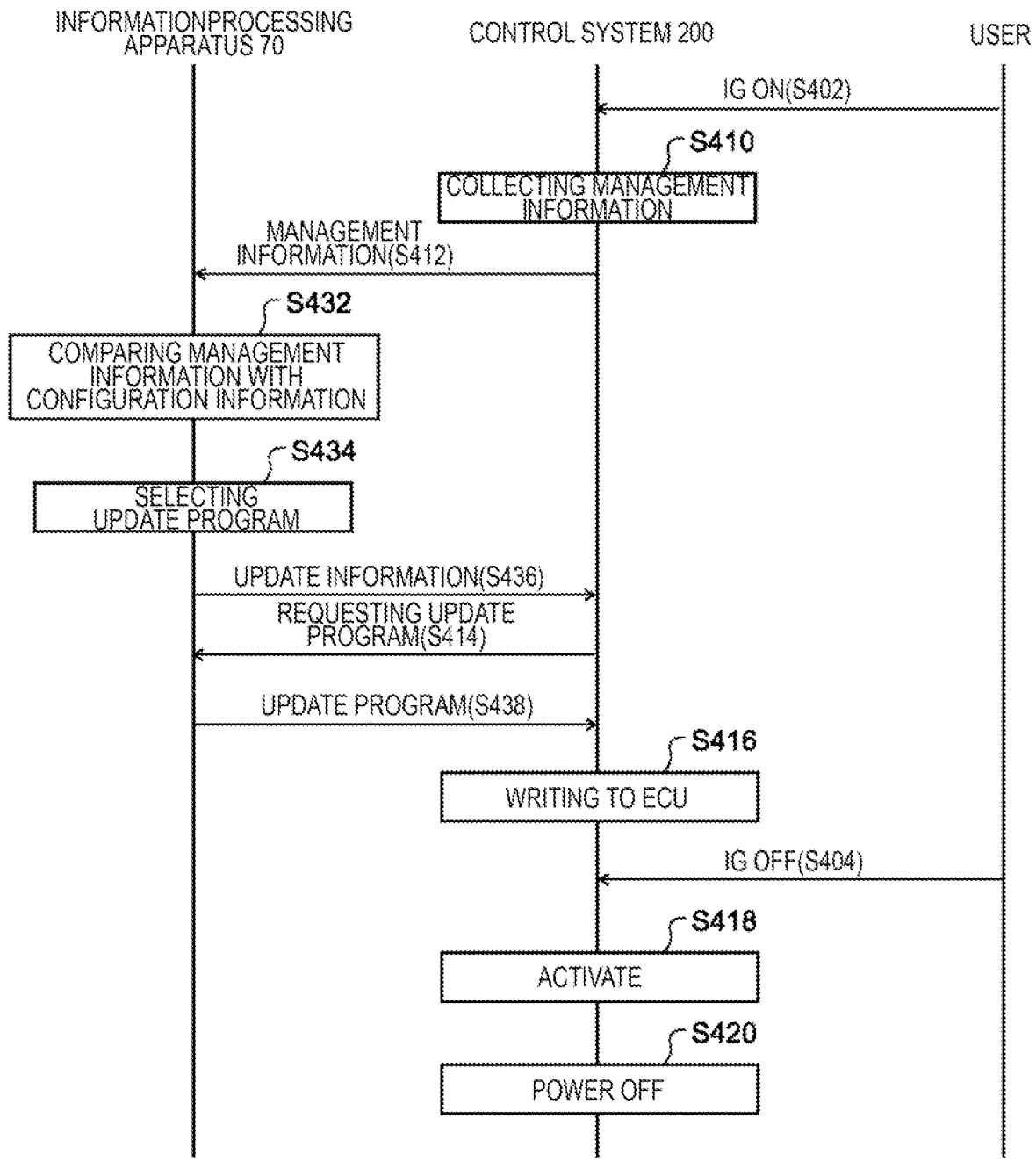
FIG. 7 schematically illustrates an execution sequence related to program update processing.

FIG. 7 schematically illustrates an execution sequence related to the program update processing. The execution sequence in FIG. 7 is the execution sequence from the time the IG switch of the vehicle 20 is turned on to the time the IG power of the vehicle 20 is turned off.

In S402, when the IG power of the vehicle 20 is turned on by the user by turning on the IG switch, then in S410, the update control unit 220 collects the management information stored by each ECU and stores it in the internal memory of the ECU 202.

In S412, the transmission control unit 250 transmits the management information collected from each ECU to the information processing apparatus 70 through the TCU 201 or IVI 299. Upon receiving the management information, the selection unit 350 compares the received management information with the configuration information of the vehicle 20 stored in the storage unit 380 (S432) and selects the update program (S434). For example, if the received management information matches the configuration information of the vehicle stored in the storage unit 380, the selection unit 350 searches the program registration information stored in the storage unit 380 and selects the new version of the program as the update program. If any of the versions included in the received management information is older than the version included in the configuration information of the vehicle stored in the storage unit 380, the selection unit 350 searches the program registration information stored in the storage unit 380 and selects the program with the version of the configuration information of the vehicle stored in the storage unit 380 as the update program. These processes are described below.

If the update program is selected in S434, in S436, the output control unit 360 transmits the update information including the identification information of the update program to the vehicle 20 through the communication unit 390. In S414, the transmission control unit 250 selects an update program to be received by referring to the update information, and transmits an update program request requesting transmission of the selected update program to the information processing apparatus 70 through the TCU 201 or IVI 299.

In the information processing apparatus 70, upon receiving the update program request, the output control unit 360 transmits the update program requested in the update program request to the vehicle 20 through the communication unit 390. Then, in the control system 200, the update program is written to the ECU (S416). For example, when the update control unit 220 receives an update program for the ECU 205, it transfers the received update program to the ECU 205 and instructs it to write it in the program storage area on the back surface. When the writing of the update program to the program storage area on the back surface is completed, the ECU 205 is ready for activation of the update program.

When the IG switch is turned off in S404, the update control unit 220 activates the update program (S418). For example, the update control unit 220 instructs the ECU 205 to activate the update program. After the activation of the update program is completed, the update control unit 220 turns off the power state of the vehicle 20 (S420). It should be noted that after the power state of the vehicle 20 is turned off, when the IG switch is turned on, management information is collected from each ECU as in the process of S410 and S412, and the management information after the program update is transmitted to the information processing apparatus 70. This synchronizes the management information of the vehicle 20 with the management information of the vehicle 20 managed by the information processing apparatus 70.

Herein, it is assumed that the ECU 205 has been replaced with an ECU with an older version of the program written into it during maintenance of the vehicle 20. First, it is assumed that the management information of all ECUs equipped with the control system 200 and the management information contained in the configuration information managed by the information processing apparatus 70 are the same before the maintenance of the vehicle 20. It is also assumed that each ECU included in the control system 200 is in a state that does not require program updates.

Figure 8:
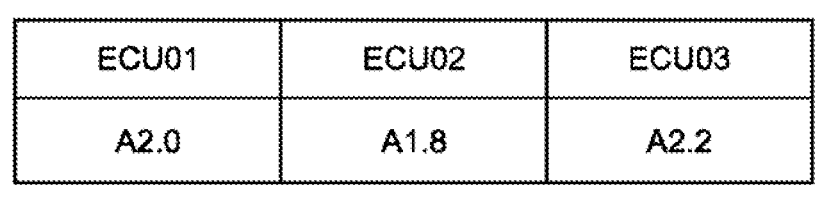

FIG. 8 illustrates management information stored in each ECU of the vehicle 20 after maintenance. As shown in FIG. 8, the version information of "ECU02" corresponding to ECU 205 is "A1.8", which is lower than the version of "A2.0" shown in FIG. 5. In this case, the update control unit 220 recognizes that the version of the ECU 205 has become low when the IG power is turned on, and transmits management information to restore the program of the ECU 205 to the program with the version of "A2.0".

In the information processing apparatus 70, upon receiving the management information transmitted from the vehicle 20, the selection unit 350 recognizes that the version of the program of the ECU 205 has been lowered from "A2.0" to "A1.8" by comparing it with the configuration information of the vehicle 20 stored in the storage unit 380. In this case, the selection unit 350 searches the program registration information stored in the storage unit 380 and selects the program with the version of "A2.0" as the update program. This allows the ECU 205 to be updated to the version of the program managed by the information processing apparatus 70 even if the ECU 205 is replaced and the program version is no longer consistent.

As described in relation to FIG. 8, the case where the version of the program written in the ECU has been lowered has been described, and the process by which the information processing apparatus 70 selects an update program has been described. However, the process to be executed by the control system 200 and the information processing apparatus 70 may vary depending on the progress status and version of the program update of the ECU included in the control system 200.

FIG. 9 illustrates the mapping between the combination of timing and version when the vehicle 20 is turned on IG and the process performed by the control system 200.

"Timing 1" indicates the timing when the update information is not received from the information processing apparatus 70. "Timing 2" indicates the timing during writing the update program into the ECU. "Timing 3" indicates the state when the writing of the update program into the ECU has been completed. "Timing 4" indicates the timing after the activation of the update program being completed.

"Case 1" indicates the case where the version of the program written to the ECU matches the version of the program to be updated. "Case 2" indicates the case where the version of the program written to the ECU is lower than the version of the program to be updated. "Case 3" indicates the case where a program for another system is written to the ECU. "Case 4" indicates the case where the version of the program written to the ECU matches the current version.

"Update information discard" in FIG. 9 indicates that the update information already received from the information processing apparatus 70 is discarded and that the program being written to the ECU or written to the ECU is not used. The "configuration synchronization" in FIG. 9 represents the process by which the vehicle 20 transmits management information to the information processing apparatus 70. It should be noted that the process described in relation to FIG. 8 corresponds to the process in "Case 2" and "Timing 1" in the table in FIG. 9.

First, the case of "Case 1" is described. "Case 1" is specifically a case where an ECU has been replaced with an ECU that has been activated with a program of the version that is scheduled to be updated in the update information. In the case of "Case 1" and "Timing 1", the control system 200 performs normal configuration synchronization. As a result, in the information processing apparatus 70, it is determined that there is no need to perform a program update after synchronization with the configuration information managed by the information processing apparatus 70. In addition, no update information is transmitted from the information processing apparatus 70 because the situation does not require a program update.

In the case of "Case 1" and "Timing 2", the control system 200 discards the update information and performs another configuration synchronization. As a result, in the information processing apparatus 70, it is determined that there is no need to perform a program update after synchronization with the configuration information managed by the information processing apparatus 70. In addition, no update information is transmitted from the information processing apparatus 70 because the situation does not require a program update. In the case of "Case 1" and "Timing 3", the same process as in the case of "Case 1" and "Timing 2" is executed.

In the case of "Case 1" and "Timing 4", the control system 200 transmits a message to the information processing apparatus 70 that the update is successful. Since the ECU has been replaced with an ECU that has the same version of the program written as the version to be updated, the control system 200 transmits the information that the update is successful to the information processing apparatus 70. That is, the process is the same as the process to be executed when the update of the ECU before replacement is completed.

Next, the case of "Case 2" is described. As described in relation to FIG. 8 and so on, Case 2 is a case where an ECU has been replaced with an ECU that has been activated with a program of an older version than the version that is scheduled to be updated in the update information. In the case of "Case 2" and "Timing 1", the control system 200 performs configuration synchronization, as described in relation to FIG. 8. In the information processing apparatus 70, the version of the management information is compared with the version of the configuration information managed by the information processing apparatus 70, and it is determined that the program is to be updated to the same version of the program that has been written in the ECU before replacement, and the update information is transmitted to the control system 200.

In the case of "Case 2" and "Timing 2", the control system 200 discards the update information and performs another configuration synchronization. This cancels the program update process and transmits the update information to the control system 200 to update the program to the same version of the program that has been written in the ECU before the replacement, similar to "Case 2" and "Timing 1". In the case of "Case 2" and "Timing 3", the same process as in "Case 2" and "Timing 2" is executed.

In the case of "Case 2" and "Timing 4", the ECU has been replaced after the activation of the update program based on the update information has been completed. Therefore, the control system 200 notifies the user of the update failure through MID 298 and IVI 299, and requests the user to perform maintenance of the vehicle 20 at a dealer.

Next, the case of "Case 3" is described. "Case 3" is a case where the ECU is replaced with one that has a different program installed for a different vehicle type than the vehicle type of the vehicle 20, for example. This determination is performed based on the version name of the program, for example. For example, suppose that the ECU of the vehicle type to which the vehicle 20 belongs is defined to install a program whose version name starts with "A". In this case, if the management information stored in the ECU contains a version name that starts with "B," the control system 200 can determine that it is not the correct version name for the vehicle 20.

In the case of "Case 3" and "Timing 1", configuration synchronization is performed regardless of the consistency of version names. By determining the version name, the information processing apparatus 70 also determines that the case corresponds to "Case 3". In this case, the information processing apparatus 70 notifies the control system 200 of the error. The control system 200 requests the user through MID 298 and IVI 299 to perform maintenance of the vehicle 20 serviced at the dealer.

In the case of "Case 3" and "Timing 2", the control system 200 discards the update information and performs another configuration synchronization. As a result, the error is notified to the control system 200 from the information processing apparatus 70 as in the case of "Case 3" and "Timing 1". The control system 200 also requests the user through MID 298 and IVI 299 to perform maintenance of the vehicle 20 at a dealer. In the case of "Case 3" and "Timing 3", the same process as in "Case 3" and "Timing 2" is executed.

In the case of "Case 3" and "Timing 4", the ECU was replaced after the activation of the update program based on the update information was completed. Therefore, the control system 200 notifies the user of the update failure through MID 298 and IVI 299, and requests the user to perform maintenance of the vehicle 20 at a dealer.

Next, the case of "Case 4" is described. "Case 4" is specifically the case where the ECU is replaced with an ECU that has the same version of the program activated as the current one. In the case of "Case 4" and "Timing 1", the control system 200 performs normal configuration synchronization. In the information processing apparatus 70, this synchronizes the configuration information with the configuration information managed by the information processing apparatus 70, and if the newest update program exists, the update information is transmitted from the information processing apparatus 70 to the control system 200.

In the case of "Case 4" and "Timing 2", the control system 200 continues to write the update program to the ECU. Since the writing of the update program is not yet completed, the program update can be continued by continuing to write the update program to the ECU. It should be noted that in the case of "Case 4" and "Timing 2", the update information may be discarded and the configuration synchronization may be performed again. This allows the newest program update to be performed again at the current timing.

In the case of "Case 4" and "Timing 3," the control system 200 notifies the user of the update failure through MID 298 and IVI 299, and requests the user to perform maintenance of the vehicle 20 at a dealer. Inconsistency in version information occurs because the ECU is replaced after the update program has been written based on the update information.

In the case of "Case 4" and "Timing 4", the ECU has been replaced after the activation of the update program based on the update information has been completed. Therefore, the control system 200 notifies the user of the update failure through MID 298 and IVI 299, and requests the user to perform maintenance of the vehicle 20 at a dealer.

As explained above, according to the update system 10 of this embodiment, even when an ECU included in the control system 200 is replaced, it can be updated to the same version of the program that has been written in the ECU before the replacement. This ensures that the function added by past OTAs can be fully utilized.

The vehicle 20 is a vehicle as an example of transport equipment. The vehicle may be an automobile with an internal combustion engine, an electric vehicle, a fuel cell vehicle (FCV), or any other automobile. The automobile includes a bus, a truck, a motorcycle, and so on. The vehicle may be a saddle car or other vehicle, or it may be a motorcycle. In addition to the vehicle, transport equipment includes an aircraft, including an unmanned aerial vehicle, a ship, and other equipment. Transport equipment may be any equipment that transports people or goods. Transport equipment is an example of a mobile object. The mobile object is not limited to transport equipment but may be any mobile equipment.

Figure 10:
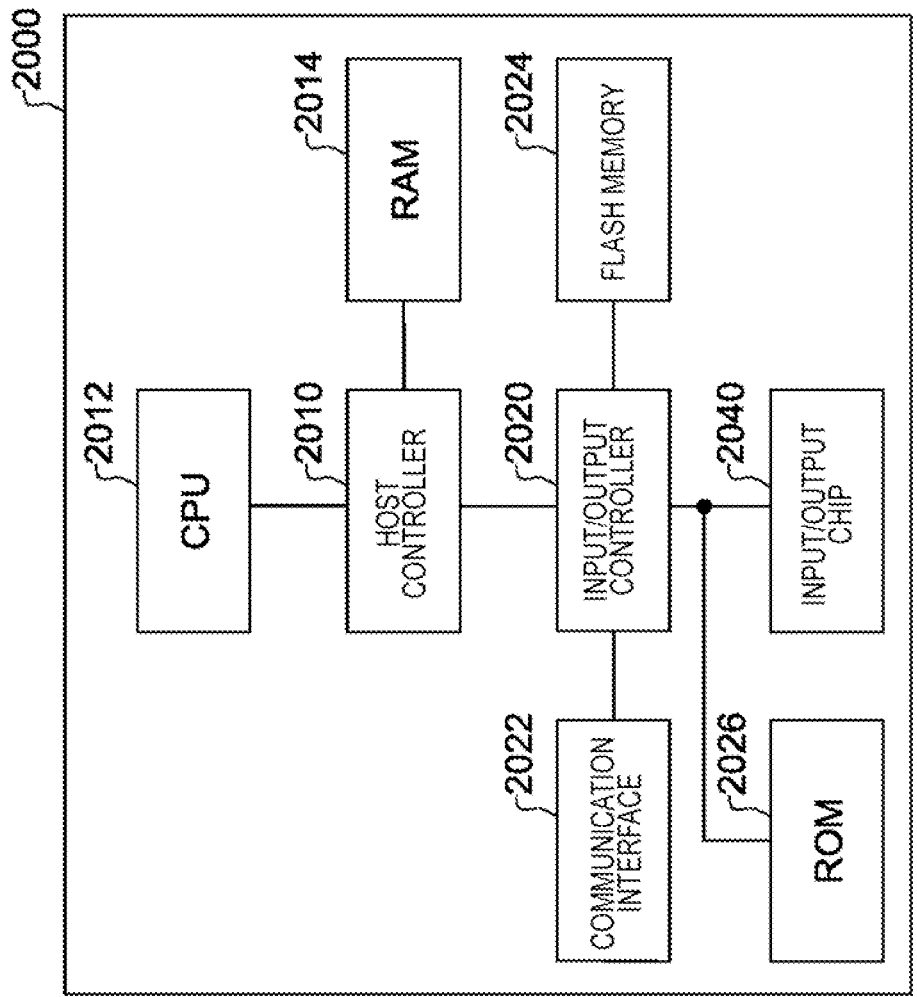
FIG. 10 illustrates an example of a computer 2000.

FIG. 10 illustrates an example of a computer 2000 in which a plurality of embodiments of the present invention may be entirely or partially embodied. The program installed in the computer 2000 can cause the computer 2000 to function as a system or each unit of a system, such as a control system, or an apparatus, such as an information processing apparatus, or each unit of such an apparatus, in accordance with the embodiments, or to perform operations associated with the system or each unit of the system or an apparatus or each unit of such an apparatus, and/or to perform processes or stages of such processes in accordance with embodiments. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input and output chip 2040. The ROM 2026, the flash memory 2024, the communication interface 2022, and the input and output chip 2040 are connected to the host controller 2010 via an input and output controller 2020.

The CPU 2012 operates according to programs stored in the ROM 2026 and the RAM 2014, thereby controlling each unit.

The communication interface 2022 communicates with other electronic devices via a network. The flash memory 2024 stores a program and data used by the CPU 2012 in the computer 2000. The ROM 2026 stores a boot program or the like executed by the computer 2000 during activation, and/or a program depending on hardware of the computer 2000. The input and output chip 2040 may also connect various input and output units such as a keyboard, a mouse, and a monitor, to the input and output controller 2020 via input and output ports such as a serial port, a parallel port, a keyboard port, a mouse port, a monitor port, a universal serial bus (USB) port, a high-definition multimedia interface (HDMI (registered trademark)) port.

A program is provided via a computer-readable storage medium such as a CD-ROM, a DVD-ROM, or a memory card, or a network. The RAM 2014, the ROM 2026, or the flash memory 2024 is an example of the computer-readable storage medium. The program is installed in the flash memory 2024, the RAM 2014 or the ROM 2026 and executed by the CPU 2012. Information processing written in these programs is read by the computer 2000, and provides cooperation between the programs and the various types of hardware resources mentioned above. An apparatus or a method may be configured by realizing operation or processing of information according to a use of the computer 2000.

For example, when communication is performed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a storage medium such as the RAM 2014 or the flash memory 2024, transmits the read transmission data to the network, and writes reception data received from the network into a reception buffer processing region or the like provided on the storage medium.

In addition, the CPU 2012 may cause all or a necessary portion of a file or a database stored in a storage medium such as the flash memory 2024 to be read into the RAM 2014, and perform various types of processing on the data on the RAM 2014. Next, the CPU 2012 writes back the processed data into the storage medium.

Various types of information such as various types of programs, data, a table, and a database may be stored in the storage medium and may be subjected to information processing. The CPU 2012 may execute, on the data read from the RAM 2014, various types of processing including various types of operations, information processing, conditional judgement, conditional branching, unconditional branching, information retrieval and replacement, or the like described in this specification and specified by instruction sequences of the programs, and write back a result into the RAM 2014. In addition, the CPU 2012 may search for information in a file, a database, or the like in the storage medium. For example, when a plurality of entries, each having an attribute value of a first attribute associated with an attribute value of a second attribute, is stored in the storage medium, the CPU 2012 may search for an entry having a designated attribute value of the first attribute that matches a condition from the plurality of entries, and read the attribute value of the second attribute stored in the entry, thereby obtaining the attribute value of the second attribute associated with the first attribute that satisfies a predetermined condition.

The programs or software modules described above may be stored in a computer-readable storage medium on the computer 2000 or in the vicinity of the computer 2000. A storage medium such as a hard disk or a RAM provided in a server system connected to a dedicated communication network or the Internet can be used as a computer-readable storage medium. The program stored in the computer-readable storage medium may be provided to the computer 2000 via the network.

The program that is installed in the computer 2000 and makes the computer 2000 function as the control system 200 may work on the CPU 2012 and so on to make the computer 2000 function as each of the each unit of the control system 200. The information processing described in these programs, when read into a computer, functions as each part of the control system 200, which is a concrete means of cooperation between software and the various hardware resources described above. Then, by realizing the calculation or processing of information according to the purpose of use of the computer 2000 in this embodiment by these specific means, a control system 200 specific to the purpose of use is constructed.

The program which is installed on the computer 2000 and causes the computer 2000 to serve as the information processing apparatus 70 may instruct the CPU 2012 or the like to cause the computer 2000 to serve as each unit of the information processing apparatus 70. The information processing described in those programs are read by the computer 2000, thereby serving as each unit of the information processing apparatus 70, which is specific means realized by the cooperation of software and the various types of hardware resources mentioned above. Then, those specific means achieves operations or processing of information corresponding to the intended use of the computer 2000 according to this embodiment, so that the information processing apparatus 70 is constructed as a specific one corresponding to the intended use.

Various embodiments have been described with reference to the block diagrams and the like. In the block diagrams, each block may represent (1) a step of a process in which an operation is executed, or (2) each unit of the apparatus having a role in executing the operation. Specific steps and each unit may be implemented by a dedicated circuit, a programmable circuit supplied along with a computer-readable instruction stored on a computer-readable storage medium, and/or a processor supplied along with the computer-readable instruction stored on the computer-readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and other logical operations; a memory element such as a flip-flop, a register, a field programmable gate array (FPGA), a programmable logic array (PLA), or the like; and so on.

The computer-readable storage medium may include any tangible device capable of storing an instruction executed by an appropriate device. As a result, the computer-readable storage medium having the instruction stored thereon constitutes at least a part of a product including an instruction that may be executed in order to provide a means to execute an operation specified by a processing procedure or a block diagram. Examples of the computer readable storage medium may include an electronic storage medium, a magnetic storage medium, an optical storage medium, an electromagnetic storage medium, a semiconductor storage medium, or the like. More specific examples of the computer-readable storage medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, and the like.

Computer readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc. and conventional procedural programming languages, such as the "C" programming language or similar programming languages.

Computer-readable instructions may be provided to a processor of a general purpose computer, a special purpose computer, or other programmable data processing apparatus, or to programmable circuit, locally or via a local area network (LAN), wide area network (WAN) such as the Internet, and a computer-readable instruction may be executed to provide means for performing operations specified in the described processing procedures or block diagrams. Examples of processors include computer processors, processing units, microprocessors, digital signal processors, controllers, microcontrollers, and the like.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: update system; 20: vehicle; 70: information processing apparatus; 90: communication network; 200: control system; 201: TCU; 202: ECU; 204: ECU; 205: ECU; 206: ECU; 220: update control unit; 230: notification control unit; 240: acquisition unit; 250: transmission control unit; 280: in-vehicle communication line; 294: FI; 295: advanced safety system; 296: battery; 298: MID; 299: IVI; 310: acquisition unit; 320: storage control unit; 350: selection unit; 360: output control unit; 380: storage unit; 390: communication unit; 2000: computer; 2010: host controller; 2012: CPU; 2014: RAM; 2020: input/output controller; 2022: communication interface; 2024: flash memory; 2026: ROM; 2040: input/output chip

What is claimed is:

1. An information processing apparatus, comprising:
a storage control unit, configured to store, in advance, version information of each of a plurality of programs for controlling each of a plurality of mobile object control units included in a mobile object;
an acquisition unit, configured to acquire, from the mobile object, version information of each of a plurality of programs for controlling each of the plurality of mobile object control units when the mobile object starts up, and store the acquired version information in the storage control unit;
a selection unit, configured to select an update program of at least one mobile object control unit among the plurality of mobile object control units; and
an output control unit, configured to output the update program selected by the selection unit to the mobile object during a traveling of the mobile object, wherein the update program output to the mobile object includes at least a part of control code for instructing activation of the update program of the at least one mobile object, the activation is performed after a starting-up switch is turned off, wherein the selection unit is configured to select update program of at least one mobile object control unit among a plurality of mobile object control units included in the mobile object, based on the version information acquired by the acquisition unit, when the version information acquired by the acquisition unit is not consistent with the version information stored by the storage control unit.

2. The information processing apparatus according to claim 1, wherein the selection unit is configured to select an update program of at least one mobile object control unit among the plurality of mobile object control units, based on the version information newly acquired by the acquisition unit, so that a combination of the plurality of program versions are consistent with a combination of predetermined regular versions.

3. The information processing apparatus according to claim 1, wherein the storage control unit is configured to store the version information newly acquired by the acquisition unit after the output control unit has output the update program selected by the selection unit to the mobile object, in association with identification information of the mobile object.

4. The information processing apparatus according to claim 1, wherein the acquisition unit is configured to acquire the version information transmitted when the mobile object starts up.

5. The information processing apparatus according to claim 1, wherein the mobile object is a vehicle.

6. The information processing apparatus according to claim 2, wherein the storage control unit is configured to store the version information newly acquired by the acquisition unit after the output control unit has output the update program selected by the selection unit to the mobile object, in association with identification information of the mobile object.

7. The information processing apparatus according to claim 2, wherein the acquisition unit is configured to acquire the version information transmitted when the mobile object starts up.

8. The information processing apparatus according to claim 3, wherein the acquisition unit is configured to acquire the version information transmitted when the mobile object starts up.

9. The information processing apparatus according to claim 2, wherein the mobile object is a vehicle.

10. The information processing apparatus according to claim 9, wherein the mobile object control unit is an ECU (Electronic Control Unit) included in the vehicle.

11. A control system, comprising:
a plurality of mobile object control units for controlling a mobile object;
an update control unit, configured to perform control on program update of the mobile object; and
a transmission control unit, configured to transmit version information of each of a plurality of programs for controlling each of the plurality of mobile object control units when a starting-up switch is turned on,
wherein the update control unit is configured to, after the transmission control unit transmits the version information, acquire an update program for at least one mobile object control unit of the plurality of mobile object control units from a server for managing a combination of versions of the plurality of programs, and perform update of the at least one mobile object control unit by way of the acquired update program, the update including a plurality of updating processes containing an activation of at least one mobile object control unit, and the acquired update program including at least a part of control code for instructing the activation of the update program of the at least one mobile object; and wherein
the update control unit performs at least one updating process among the plurality of updating processes that is different from the activation during a traveling of the mobile object and performs the activation after the starting-up switch is turned off; and
the transmission control unit transmits the version information of each of the plurality of programs after update to the server when the update of the at least one mobile object control unit by the update program is completed.

12. The control system according to claim 11, wherein the mobile object is a vehicle.

13. The control system according to claim 12, wherein the control system is configured to update the mobile object control unit by OTA (Over The Air).

14. The control system according to claim 12, wherein the mobile object control unit is an ECU (Electronic Control Unit) included in the vehicle.

15. A vehicle, comprising the control system according to claim 11.

16. A system, comprising:
an information processing apparatus according to claim 1; and
the mobile object.

17. An information processing method, comprising:
storing, in advance, version information of each of a plurality of programs for controlling each of a plurality of mobile object control units included in the mobile object;
acquiring, from the mobile object, version information of each of a plurality of programs for controlling each of the plurality of mobile object control units when the mobile object starts up;
storing the acquired version information;
selecting an update program of at least one mobile object control unit among the plurality of mobile object control units; and
outputting the update program selected by the selecting to the mobile object during a traveling of the mobile object,
wherein the update program output to the mobile object includes at least a part of control code for instructing activation of the update program of the at least one mobile object, the activation is performed after a starting-up switch is turned off,
wherein the selecting is configured to select update program of at least one mobile object control unit among a plurality of mobile object control units included in the mobile object, based on the acquired version information, when the acquired version information is not consistent with the stored version information.

18. A control method, comprising:
performing control on program update of a mobile object;
transmitting version information of each of a plurality of programs for controlling each of a plurality of mobile object control units for controlling the mobile object when a starting-up switch is turned on;

acquiring, after version information has been transmitted, an update program for at least one mobile object control unit of the plurality of mobile object control units from a server for managing a combination of the versions of the plurality of programs, and performing update of the at least one mobile object control unit using the update program acquired, the update including a plurality of updating processes containing an activation of at least one mobile object control unit, and the acquired update program including at least a part of control code for instructing the activation of the update program of the at least one mobile object; and transmitting the version information of each of the plurality of programs after update to the server when the update of the at least one mobile object control unit by the update program is completed, wherein the performing update of the at least one mobile object control unit includes performing at least one updating process among the plurality of updating processes that is different from the activation during a traveling of the mobile object and performing the activation after the starting-up switch is turned off.

* * * * *